United States Patent [19]

Murray

[11] Patent Number: 4,521,990

[45] Date of Patent: Jun. 11, 1985

[54] RETAINER FOR ATTACHING FLORAL LID CONTAINER

[75] Inventor: John F. Murray, Pacific Palisades, Calif.

[73] Assignee: Teleflora, Inc., Los Angeles, Calif.

[21] Appl. No.: 601,734

[22] Filed: Apr. 19, 1984

Related U.S. Application Data

[63] Continuation of Ser. No. 546,960, Oct. 31, 1983, abandoned.

[51] Int. Cl.³ .............................................. A01G 5/00
[52] U.S. Cl. .................................................. 47/41.12
[58] Field of Search ...................... 47/41, 41 SS, 41.1, 47/41.11, 41.12

[56] References Cited

U.S. PATENT DOCUMENTS 1,491,926  4/1924  Rosenwald .......................... 47/41.11
1,562,992  11/1925  Schling .
1,737,991  12/1929  Borchers .
1,973,868  9/1934  Field ................................... 47/41.11
2,908,112  10/1959  Koistinen ................................ 47/41
3,177,617  4/1965  Koistinen ........................... 47/41.11

Primary Examiner—Robert A. Hafer
Assistant Examiner—Bradley M. Lewis
Attorney, Agent, or Firm—Pretty, Schroeder, Brueggemann & Clark

[57] ABSTRACT

A retainer for attaching a lid to a container in which a floral bouquet is arranged comprises a rigid shaft coupled to a flexible crossbar to form generally a T-shaped assembly. The crossbar is deformed and pushed into a groove on the underside of the lid. After that, the shaft is inserted into florist's foam containing the floral arrangement so that the lid becomes a decorative and integral part of the arrangement. When the flowers have died, the retainer is removed from the lid and discarded. The empty container may be used with the lid to hold a variety of objects and things.

17 Claims, 4 Drawing Figures

Fig. 1
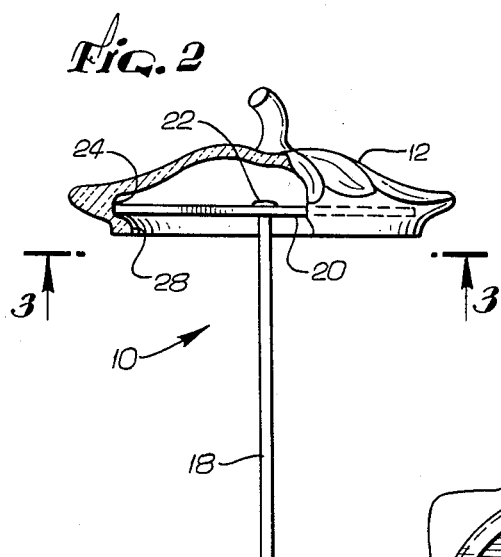
Fig. 2
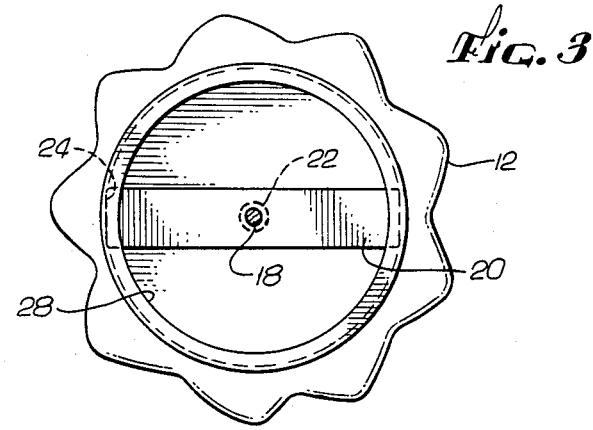
Fig. 4
Fig. 3

RETAINER FOR ATTACHING FLORAL LID CONTAINER

This is a continuation of application Ser. No. 06/546,960, now abandoned, filed Oct. 31, 1983.

FIELD OF THE INVENTION

This invention relates to the field of floral containers, and more particularly, to a T-shaped retainer for permitting relatively quick and easy attachment of a lid to a container in which a floral bouquet is arranged.

BACKGROUND OF THE INVENTION

It recently has become popular to sell floral bouquets along with items which may be useful to the purchaser after the flowers have died. For example, floral bouquets now are sold in containers having detached lids which may be used with the containers after the flowers have been discarded. However, florists have encountered problems selling arrangements in such two-piece floral containers because of the absence of a convenient method for securing the lid to the arrangement at the time it is sold to the customer.

Previous known methods for marketing floral arrangements in containers with lids have been either ineffective or aesthetically unpleasing. One method has been simply to hand the lid to the customer at the time the bouquet is purchased, leaving the customer with the burden of having to keep track of the lid's whereabouts until the flowers were thrown away. This method has not been effective because the unattached lid is easily susceptible of being misplaced and lost, or of being dropped and broken by the customer. Another method has been to affix the lid directly to the side of the container by adhesive means, such as tape. While this method may prevent the lid from becoming lost or broken, the high visibility of the tape and incongurous position of the lid on the side of the container create an overall appearance which detracts from the beauty of the arrangement.

Thus, despite the potentially substantial market for floral bouquets sold in useful two-piece floral containers, customers have been reluctant to purchase them because of the likelihood that the lid will be lost or broken, or because the lid cannot be secured to the container in an ornamental fashion. As a result of this customer reluctance, florists generally have not been interested in marketing such arrangements.

Accordingly, there has existed a definite need for a convenient and economical means for attaching a lid to a floral container in a decorative and effective manner. The present invention satisfies this need and provides further related advantages.

SUMMARY OF THE INVENTION

This invention provides a retainer which quickly and easily attaches a lid to a container in which a floral bouquet is arranged. The retainer secures the lid directly to the flower arrangement in a manner that allows the lid to become a decorative and integral part of the arrangement. Moreover, the retainer of the present invention is inexpensive to manufacture and simple to use.

More specifically, the retainer comprises a rigid shaft and a flexible crossbar. One end of the shaft is coupled by a suitable fastener between the ends of the crossbar so that the retainer forms generally a T-shaped assembly. This structural arrangement allows the ends of the crossbar to flex about the axis of the shaft.

To secure the retainer to the lid, the crossbar is deformed and pushed into a groove provided on the underside of the lid, with the shaft extending away from the underside. After that, the shaft is inserted into stalk supporting material, typically florist's foam, holding the floral arrangement within the container. The term florist's foam refers to foamed rigid plastic block material used by florist's to retain the stalks of cut flowers in position in an arranged bouquet. One such material is provided by rigid foamed polyurethane. In addition, equivalent materials such as wire netting may be used within the container to receive and support the flower stalks and to likewise receive and support retainer shaft.

The shaft is inserted into the stalk supporting material or equivalent material so that the lid becomes a unitary part of the arrangement and decoratively blends in with the flowers or plants comprising the arrangement. After the flowers have died, the retainer easily may be removed from the lid by pulling on the shaft and deforming the crossbar so that it snaps out of the groove of the lid. Once removed, the retainer may be discarded, and the empty container may be used with the lid to hold a variety of objects and things.

The retainer solves basic florist needs by making the sale of an arrangement in a two-piece container more expeditious and convenient, and more significantly, effectively opens up a new market for floral bouquets arranged in containers having lids which may be used after the flowers die. Thus, a formerly discarded container now can become a useful item to hold a variety of objects and things. Furthermore, the retainer is safe to use and may be conveniently snapped into the lid and packed for shipment along with the container and lid.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a floral bouquet arranged in a container showing the retainer, indicated by dashed lines, with the shaft inserted in florist's foam and the lid decoratively positioned as an integral part of the bouquet;

FIG. 2 is a cross-sectional elevational view of the retainer and lid, partly in cutaway section, showing the crossbar inserted into the groove of the underside of the lid;

FIG. 3 is a horizontal section taken along line 3—3 of FIG. 2; and

FIG. 4 is a perspective view of the retainer showing the crossbar in a deformed and undeformed state.

DETAILED DESCRIPTION OF THE PREFERRED EMBODIMENT

As shown in the exemplary drawings, the present invention is embodied in a retainer, indicated generally by the reference numeral 10, for securing a lid 12 to a container 14 in which a floral bouquet 16 is arranged. The retainer 10 decoratively attaches the lid 12 to the container 14 as an integral part of the bouquet 16 and reduces the chance that the lid 12 will become lost or broken by the florist or customer. Further, the retainer 10 of this invention is relatively inexpensive to manufacture, reliable and simple to use, and may be installed completely by hand.

As best shown in one preferred form in FIGS. 1-4, the retainer 10 comprises a rigid shaft 18 and a flexible crossbar 20 which are connected together by a conventional fastener 22 to form generally a T-shaped assembly. As explained more fully below, the crossbar 20 is adapted to be inserted into a groove 24 provided on the underside of the lid 12, and the shaft 18 is adapted for insertion into a body of stalk supporting material 26, typically florist's foam, which holds the stalks of the flowers and other materials comprising the floral bouquet 16 within the container 14.

The shaft 18 preferably is made of metal, wood, plastic or another rigid material that resists bending and will support the weight of the lid 12 once the shaft 18 is inserted into the foam 26. Further in this regard, the shaft 18 also must be of sufficient length to be firmly anchored in the foam 22. The cross-sectional area of the shaft 18 also must be small enough to facilitate insertion of the shaft 18 into the foam 26. In the preferred embodiment, the shaft 18 is circular in cross-section and resembles a thin tube, but it can be of triangular, rectangular, hexagonal or other shapes if desired.

The shaft 18 preferably is coupled to the center of the crossbar 20 to allow a substantially equal amount of flexing of the crossbar 20 on opposite sides of the shaft 18. Alternatively, the shaft 18 may be joined at any point between the ends of the crossbar 20 so long as there is a sufficient amount of flexure to insert the crossbar 20 into the groove 24 of the lid 12. However, the shaft 18 must not be coupled too close to one end of the crossbar 20. Otherwise, the shaft 18 will interfere with a lip 28 of the groove 24 upon insertion of the crossbar 20.

The crossbar 20 preferably is made of plastic, soft wood or another flexible yet resilient material. Flexibility is necessary to permit adequate deformation of the crossbar 20 and insertion into the groove 24 provided on the underside of the lid 12. Resiliency is required to maintain the ends of the crossbar 20 in snug contact with the groove 24, as described more fully below.

The substantially rectangular structural configuration of the crossbar 20 in the preferred embodiment provides several important functional advantages. The flat, substantially square-shaped ends of the crossbar 20 provide firm engagement with corresponding sections of the groove 24 and maintain a fixed relationship between the lid 12 and the crossbar 20. If the crossbar 20 was, for example, round instead of flat, the lid 12 would be undesirably permitted to rotate about the axis of the round crossbar. It is understood that only the portions of the crossbar 20 which engage the groove 24 need to be of the flat, square-shaped configuration described above.

The length of the crossbar 20 preferably is slightly longer than the diameter of the circle defined by the groove 24. Thus, after insertion, there is a slight bend in the crossbar 20 which, due to the resilient properties of the crossbar 20, causes the ends of the crossbar 20 to exert a radial force upon the groove 24. This force maintains the fixed position of the lid 12 with respect to the crossbar 20 and prevents undesirable rotation or wobbling of the lid 12. It is understood that the length of the crossbar 20 can be increased or decreased to accomodate lids of various sizes and groove diameters.

To maintain the desired flexibility and resiliency of the crossbar 20, the thickness of the crossbar 20 which generally governs the bending characteristics described above, should be increased as the length of the cross-bar 20 from one end of the groove 24 to the other increases.

The use of the retainer 10 now will be explained. The user, typically a florist, holds the shaft 18 in one hand and the lid 12 in the other. One end of the crossbar 20 is inserted into the groove 24 of the lid 12, and then, the user pushes down on the shaft 18 so that the crossbar 20 begins to bend. Eventually, the crossbar 20 will bend far enough to cause the uninserted end of the crossbar 20 to pass beyond the lip 28 and snap into the groove 24. The lid 12, which now is firmly secured to the crossbar 20, is ready for placement in an appropriate position in the floral bouquet 16. To attach the lid 12 to the floral bouquet 16, the lid 12 is grasped firmly, and the end of the shaft 18 is pushed into a desired location in the foam 26. The lid 12 may be decoratively positioned in any desired position so that it becomes an attractive and integral part of the arrangement. With the lid 12 firmly secured in this fashion, the likelihood that it will become lost or broken is reduced substantially.

To remove the lid 12 from the floral bouquet 16 after the flowers have died, the lid 12 is grasped firmly and pulled away from the bouquet 16 removing the shaft 18 from the foam 26. To remove the crossbar 20 from the lid 12, the user, usually a customer at this point, grabs the end of the shaft 18 furthest from the crossbar 20 and applies a torque which forces the end of the shaft 18 down towards one end of the crossbar 20. This bends the crossbar 20 and eventually forces the other end of the crossbar 20 over the lip 28 and out of the groove 24. Alternatively, the shaft 18 may be pulled directly up and away from the underside of the lid 12. This causes both ends of the crossbar 20 to bend substantially equally, as best illustrated by the phantom lines of FIG. 4. Once removed, the retainer 10 may be thrown away if desired.

From the foregoing, it will be appreciated that the retainer of this invention allows a simple and effective means for attaching a lid to a container in which a floral bouquet is arranged. While a particular form of the invention has been illustrated and described, it will be apparent that various modifications can be made without departing from the spirit and scope of the invention. Accordingly, it is not intended that the invention be limited, except as by the appended claims.

What is claimed is:

1. In combination,
   a container for holding a bouquet of flowers with the flower stalks projecting through an opening in the container;
   a lid removably mountable on said container to close said opening when said container is not in use for holding the flowers;
   a crossbar releasably engageable with said lid;
   a body of stalk supporting material removably positioned within said container for receiving and supporting the ends of the flower stalks with the flowers positioned outside said container; and
   a shaft fixedly connected at one end to said crossbar extending generally perpendicularly therefrom, said shaft having its opposite end received within and supported by said body of stalk supporting material, said shaft being of sufficient length to pass through said opening with its one end supporting said crossbar and said lid outside said container in adjacent relation to said flowers when said container is in use for holding flowers.

2. The combination as defined in claim 1 wherein said lid has spaced opposed recesses and wherein said crossbar has opposite ends which mate with said recesses to releasably secure said crossbar to said lid.

3. The combination as defined in claim 2 wherein said crossbar comprises a flat elongate sheet of material which is resiliently deflectable to allow said sheet to be deformed so that its said opposite ends can fit into said recesses in said lid and be positively retained therein.

4. A disposable assemblage in combination with a container, the container having a lid closing an opening in the container with the lid being removable to enable the container to be used as a holder for flowers forming a bouquet, the assemblage comprising:

a crossbar releasably engaged with the lid;

a body of stalk supporting material within the container for receiving and supporting the ends of the flower stalks so that they project through the opening in the container; and a shaft fixedly connected at one end to said crossbar extending generally perpendicularly therefrom, said shaft having its opposite end received within and supported by said body of stalk supporting material, said shaft being of sufficient length to pass through the opening in the container with its one end supporting said crossbar and the lid outside the container in adjacent relation to the flowers, said body of stalk supporting material being removable from the container and said crossbar being disengageable from the lid whereby the lid may be used to close the opening in the container when it is not needed to hold flowers.

5. The disposable assemblage as defined in claim 4 wherein the lid has spaced opposed recesses and wherein said crossbar has opposite ends which engage said recesses to releasably secure said crossbar to the lid.

6. The disposable assemblage as defined in claim 5 wherein said crossbar comprises a flat elongate sheet of material which is resiliently deflectable to allow said sheet to be deformed so that its said opposite ends can fit into said recesses in the lid and be positively retained therein.

7. A retainer for attaching a lid in combination with a floral bouquet container having a lid closing an opening in the container when the lid has been removed to allow a bouquet of flowers to be positioned in the container projecting through the opening, the flowers having their stalks received within and supported by a body of stalk supporting material placed within the container, the retainer comprising:

a crossbar releasably engageable with the lid; and a shaft fixedly connected at one end to said crossbar extending generally perpendicularly therefrom, said shaft, at its opposite end, within and supported by the body of stalk supporting material, said shaft being of sufficient length to pass through the opening with its one end positioned outside the container supporting said crossbar and the lid outside the container in adjacent relation to the flowers.

8. The retainer as defined in claim 7 wherein said lid has spaced opposed recesses and wherein said crossbar has opposite ends which engage the recesses to releasably secure said crossbar to the lid.

9. The retainer as defined in claim 8 wherein said crossbar comprises a flat elongate sheet of material which is resiliently deflectable to allow said sheet to be deformed so that its said opposite ends can fit into the recesses in the lid and be positively retained therein.

10. A method of attaching a lid to a container for containing a bouquet of flowers when the lid has been removed from the container to uncover an opening through which the stalks of the flowers may pass to enter a body of stalk supporting material within the container, the method utilizing a T-shaped retainer having a crossbar and a shaft extending generally perpendicularly from the crossbar on one side thereof, the method comprising the steps of:

releasably connecting the crossbar of the T-shaped retainer to the lid with the shaft extending away from the lid;

passing the free end of the shaft through the opening in the container into its interior; and forcing the free end of the shaft into the body of stalk supporting material to position the lid outside the container in adjacent relation to the flowers.

11. The method as defined in claim 10 wherein the lid has spaced opposed recesses and wherein the crossbar has opposite ends which engage the recesses to releasably secure the crossbar to the lid.

12. The method as defined in claim 11 wherein the crossbar comprises a flat elongate sheet of material which is resiliently deflectable to allow the sheet to be deformed so that its opposte ends can fit into the recesses in the lid and be positively retained therein.

13. In combination:

a container for holding flowers with their stalks projecting through an opening therein;

a lid removably mountable on said container to close the opening when said container is not being used to hold flowers;

a body of stalk-supporting material removably positioned within said container for receiving and supporting the ends of the flower stalks, with the flowers positioned outside said container; and retainer means for selective use in securing said lid in a predetermined position adjacent to the flowers when said container is being used to hold flowers, said retainer means including first means releasably engagable with the underside of said lid, and second means secured to said first means and including a shaft projecting away from the underside of said lid when said first means is engaged with said lid, said shaft being of sufficient length to pass through the opening in said container and project into and be supported by said body of stalk-supporting material, thereby securing said lid in the predetermined position adjacent to the flowers.

14. The combination as defined in claim 13, wherein:

said lid includes spaced, opposed recesses on its underside; and said first means is releasably engagable with the spaced, opposed recesses on the underside of said lid.

15. The combination as defined in claim 14, wherein:

the spaced, opposed recesses on the underside of said lid face each other; and said first means includes a crossbar having opposite ends releasably engagable with the spaced, opposed recesses.

16. The combination as defined in claim 15, wherein said crossbar comprises a flat, elongated sheet of material that is resiliently deflectable, to allow said sheet to be deformed so that its opposite ends can fit into, and be retained by, the spaced, opposed recesses on the underside of said lid.

17. The combination as defined in claim 15, wherein said shaft projects generally perpendicularly from one side of said crossbar, such that said retainer means is generally T-shaped.

* * * * *